United States Patent [19]
Jordan

[11] 3,834,135
[45] Sept. 10, 1974

[54] GREASE FILTER

[76] Inventor: Anthony Jordan, 262 Great River Rd., Great River, N.Y.

[22] Filed: Oct. 2, 1973

[21] Appl. No.: 402,792

[52] U.S. Cl.............. 55/444, 55/464, 55/DIG. 36, 98/115 K
[51] Int. Cl............................................ B01d 45/08
[58] Field of Search ............ 55/422, 434, 439, 440, 55/442, 443, 444, 445, 446, 462, 464, 465, DIG. 18, DIG. 36, DIG. 37; 98/115 K, 121 R

[56] References Cited
UNITED STATES PATENTS
| | | | |
|---|---|---|---|
| 3,366,013 | 1/1968 | Madl, Jr............................. | 98/115 R |
| 3,566,585 | 3/1971 | Voloshen et al.................. | 55/443 X |

FOREIGN PATENTS OR APPLICATIONS
| | | | |
|---|---|---|---|
| 841,277 | 7/1938 | France................................. | 55/446 |
| 41,906 | 8/1907 | Switzerland.......................... | 55/422 |
| 699,760 | 11/1953 | Great Britain........................ | 55/444 |

*Primary Examiner*—Frank W. Lutter
*Assistant Examiner*—David L. Lacey
*Attorney, Agent, or Firm*—Edward H. Loveman

[57] ABSTRACT

A grease filter unit comprises upper and lower baffle plate assemblies held in adjustable opposing spaced position by bolts carrying compressed springs. Each assembly includes a plurality of straight baffle plates held in fixed laterally or transversely spaced positions by flat end bars. Each plate has a pair of transversely curved laterally spaced flanges integral with a central bridge portion constituting a partition to define two spaced parallel channels. Bridge portions of one assembly are formed with longitudinal grooves while bridge portions of the other assembly are formed with apices, to define sinuous channels for collecting grease separated centrifugally from grease laden air passing through the unit. Ends of the grooves and channels are open to drain the grease from the baffle plates.

8 Claims, 7 Drawing Figures

3,884,135

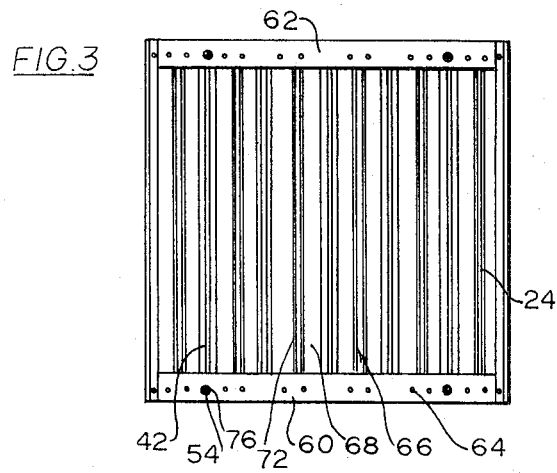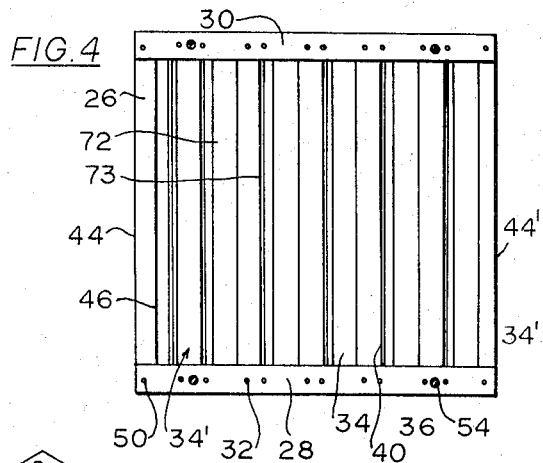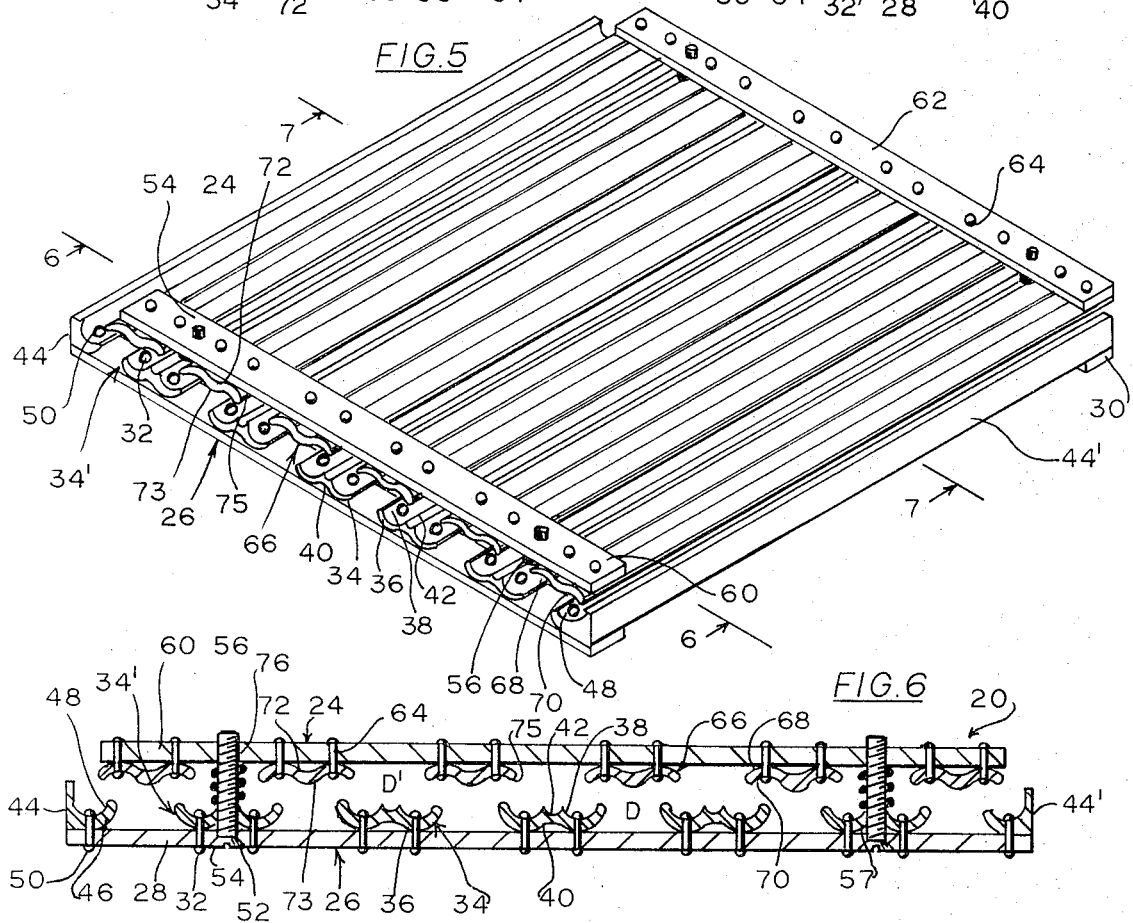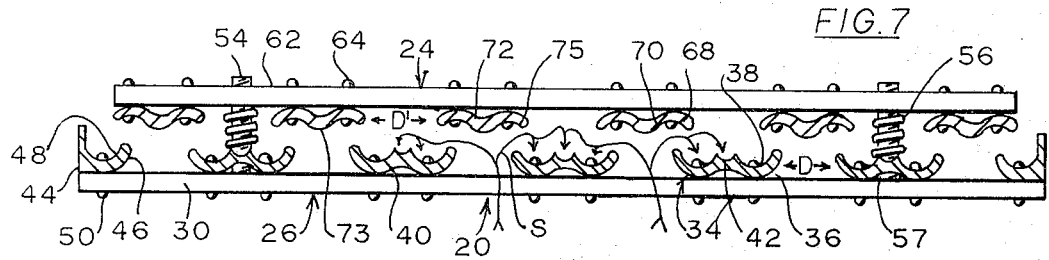

GREASE FILTER

This invention relates to a grease filter and more specifically concerns a grease filter of the type employed in canopies or hoods overlying large grills, broilers, ranges and stoves in restaurants and other places where food is prepared.

Heretofore it has been conventional to employ mesh filters to trap hot grease entrained in air drawn up by suction through the hood over the cooking area. Such prior filter units have presented a fire hazard since they collect and retain the grease which is then subject to spontaneous ignition. The prior filter units have also had other objectional features, that is, some were quite heavy and complex in construction, others were difficult to install and remove and those which retained grease drippings soon developed objectionable odors and their effeciency was impaired as their pores became clogged by grease. Moreover, they were very messy and awkward to handle and clean. It has been proposed heretofore to render the prior mesh filters somewhat more efficient by employing some metal parts coated with slippery material such as a fluorcarbon resin. This construction only partially removed some of the objections and disadvantages of prior grease filter units. The resin coatings were not fireproof, and were easily cut and scratched. The coated units employed metal grids made of expanded metal which trapped a considerable amount of debris and they were still messy and difficult to clean and handle.

The present invention is directed at overcoming the above and other difficulties and disadvantages of prior grease filters by providing a novel all-metal construction which is light in weight and easy to install and remove. The present invention substantially reduces fire hazard by draining away grease rather than collecting and retaining it. The grease is extracted from the air and flows away from the filter unit into a collecting trough. The rate of air flow through the filter unit may be adjusted and controlled by adjusting the spacing between sets of baffle plates. The baffle plates have channel shaped elements so arranged that grease is centrifugally separated from the air flowing through the filter unit. This constitutes a substantial improvement over prior filter units which can only act to collect grease which actually impinges on the mesh filter, without removing grease from the air which flows through pores or interstices in the filter. The present invention thus lowers costs of maintenance and cleanout, and saves a great deal of labor heretofore expanded in cleaning out grease collected in ducts, vents, blowers, and chimneys. The present invention uses bare metal parts which avoids the costs involved in coating prior filter units with fluorocarbon resins. At the same time it provides improved grease filtering and cleaning of the filter when required at infrequent intervals is very simple and easy.

It is therefore a principal object of the present invention to provide a grease filter unit comprising two sets of adjustably spaced, interfitting metal channel plates.

A further object of the present invention is to provide a filter unit as described in which the channel plates have curved baffles arranged to deflect air streams centrifugally so that entrained grease collects in grooves or gutters and runs off leaving the filter unit virtually clean and continuously serviceable.

Another object of the present invention is to provide an all metal, fireproof, filter unit as described which is light in weight and easily installed in and removed from a hood or canopy.

These and other objects and many of the attendant advantages of this invention will be readily appreciated as the same becomes better understood by reference to the following detailed description when considered in connection with the accompanying drawings in which:

FIG. 3 is a top plan view of a single filter embodying the invention;

FIG. 4 is a bottom plan view of the filter;

FIG. 5 is an enlarged perspective view of the filter;

FIG. 6 is an enlarged cross sectional view taken along line 6—6 of FIG. 5; and

FIG. 7 is an enlarged cross sectional view taken along line 7—7 of FIG. 5.

Figure 1:
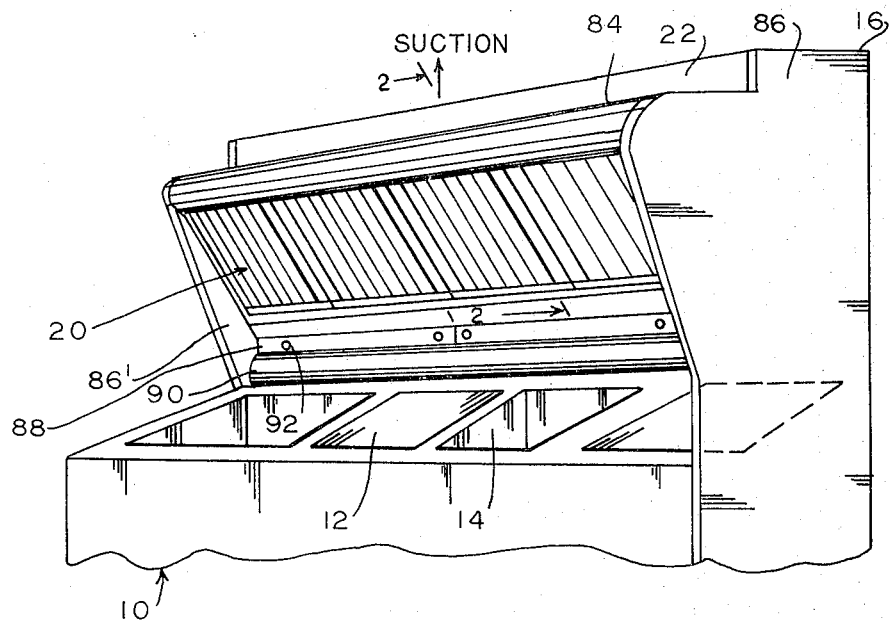
FIG. 1 is a perspective view of part of a hood or canopy over a grill and fryer range, with a plurality of filters embodying the invention installed in the hood.
Figure 2:
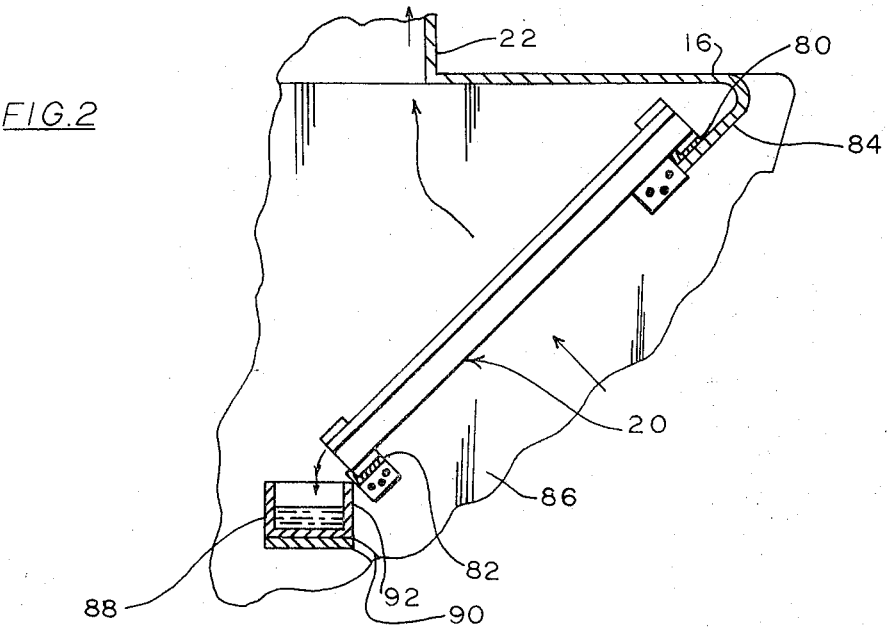
FIG. 2 is an enlarged fragmentary sectional view taken along line 2—2 of FIG. 1.

Referring now to the drawings wherein like reference characters designate like or corresponding parts throughout. there is illustrated in FIGS. 1 and 2 a form of a stove, generally designated as reference numeral 10 having a grill 12 and a fryer 14 provided with the usual burners (not shown). A hood or canopy 16 overhangs the stove 10 and carries a plurality of filters generally designated as reference numeral 20 in coplanar forwardly inclined positioned over the grill and fryer section. The hood is provided with a top vent duct 22 leading to a source of suction such as a blower (now shown) which when operated will pull streams of hot air laden with grease arising from the grill 12 and the fryer 14, through the filters 20.

The construction of the filters 20 is shown to best advantage in FIGS. 3–7 to which reference is now made. Each filter 20 includes an upper baffle plate assembly 24 and a lower baffle plate assembly 26. The lower baffle plate assembly 26 includes two frame bars or plates 28,30 at opposite ends of the assembly. Secured to these bars by a plurality of rivets 32 is a plurality of spaced baffle plates 34. Each bottom plate 34 has a pair of transversely or laterally curved baffles or flanges 36 with the concave sides facing upwardly to define a spaced channel or trough 38 (FIGS. 5, 6 & 7) and the convex sides of the flanges 36 abutted to the end bars 28,30. Each pair of the flanges 36 is integral with a raised center bridge section 40 formed with a groove 42 in its upper side extending the full length of the baffle plate 34. Each bridge section 40 constitutes a partition dividing the plate into the two channels 38. The baffle plates 34 are spaced apart a distance D substantially equal to one half the width of each of the plates 34. The assembly further includes lateral baffle plates 44, 44' each of which has a single inturned channel shaped flange 46 defining a channel or trough 48. Rivets 50 secure the plates 44, 44' to the end bars 28 and 30. Extending upwardly through two spaced countersunk holes 52 in each of the end bars 28 and 30 are bolts 54 which each carry on their respective threaded shanks a coil spring 56. The bolts 54 are located near opposite ends of the two outermost baffle plates 34' and extend through holes 57 centered in the bridge sections 40 of the baffle plates 34' which are in registration with the holes 52 (see FIGS. 6 and 7).

The upper baffle plate assembly 24 has two transversely extending frame bars or plates 60,62 at opposite ends which are shorter than the bars 28,30 but overlay them in spaced relationship. Secured to the bars 60,62 by a plurality of rivets 64 is a plurality of transversely or laterally spaced baffle plates 66 similar in structure to the plates 34. Each of the plates 66 has a pair of transversely curved baffles or flanges 68 with the concave sides facing downwardly to define a spaced channel 70 and the upper convex sides of the flanges 68 abutted to the end bars 60,62. Each pair of the flanges 68 is integral with a central bridge section 72 constituting a partition dividing the plates 66 into the two channels 70. The bridge sections 72 have a depending apices 73 centered between the flanges 36 of the adjacent baffle plates 34. The outer edges 75 of the flanges 68 are aligned with longitudinal center lines of the flanges 36. The baffle plates 34 and 66 are equal in width. The baffle plates 66 are spaced apart a distance D' which is equal to the distance D. By this arrangement sinuous paths are defined between the facing flanges of the baffle plates 34 and 66. Streams S of grease laden air are guided along these paths and centrifugally discharge the grease into the channels or troughs 38,48 and grooves 42. Upper ends of the bolts 54 are respectively engaged in a threaded hole 76 in each of the bars 60,62. The coil springs 56 are compressed and bear against the undersides of the bars 60,62. By rotating the bolts 54, the spacing between both of the baffle plate aseemblies may be adjusted. When closely spaced the edges of the respective baffle plates of each assembly interfit or extend into the troughs or channels of the opposing baffle plates.

FIGS. 1 and 2 show a plurality of filters 20 carried by a plurality of flanged brackets 80 and 82. The upper brackets 80 are supported by an upper wall 84 of the hood 16, while the lower brackets 82 are supported by a side wall 86, 86' of the hood 16. The filters 20 are carried in forwardly inclined position as clearly shown in the drawing. Just below the open lower end of each of the filters 20 is one or more grease drip troughs 88 supported on a lower wall section 90 of the hood 16, which may have a knob 92 adapted to be grasped to pull the trough 88 forward for removal from the hood 16.

As the source of suction pulls streams of heated grease laden air through the filters 20, drops of liquid grease and oil are centrifugally thrown into the channels 38,48,70 and the grooves 42. The hot air is cooled somewhat by contact with the metal of the filter units so that any vaporized grease or oil condenses and is deposited along with the liquid grease or oil in the channels 38,48,70 and the grooves 42. The liquid matter runs from the upper channels 70 into the lower channels 38,48 and the grooves 42. Then the liquid drains into the troughs 88.

During the cooking of food, a flame flare-up often occurs. The present invention effectively blocks this flame so that it cannot reach the duct 22. Furthermore burning organic matter is cooled by contact with the metal surfaces of the filter 20 so that the flames are quickly extinguished. Any solid matter and liquid in the fumes is removed centrifugally along with the liquid grease and oil by draining down along the channels 38,48 and the grooves 42.

During normal operation the oil and grease impinging on the baffle plates drains down so that the units remain virtually clean and require washing only at infrequent intervals. When washing is necessary, the filters 20 are easily lifted up and off the brackets 80,82. They may be manufactured of a relatively lightweight metal such as aluminum so that they are easily handled.

TO SUMMARIZE:

1. The filters described drastically reduce fire hazard by avoiding grease accumulations, and by draining away the grease extracted from the air streams, rather than by collecting and retaining the grease as the prior art filters.

2. The filters are light in weight to facilitate handling, installation, removal, washing, storage and shipment.

3. The filters are easy to install and remove and slide readily into place into the supporting brackets.

4. The all metal plate construction without mesh filter parts and without parts of expanded metal are easy to wash and are virtually self cleaning since the liquid oil, grease and organic matter flow down and drain out of the filters.

5. The rate of air flow through the units is readily adjustable depending on the power of suction employed.

6. The filters utilize a unique grease collecting principle employing centrifugal force to separate the grease from the air and to drain it safely away.

7. Costs of stove maintenance and cleanout are greatly lowered since the present filters keep ducts, vents and blowers cleaner than prior filters by preventing the grease from reaching these parts.

8. The filters can be made in any specified sizes to meet the requirements of any particular installation.

It should be understood that the foregoing relates to only a preferred embodiment of the invention, which have been by way of example only and that it is intended to cover all changes and modifications of the example of the invention herein chosen for the purposes of the disclosure, which do not constitute departures from the spirit and scope of the invention.

The invention claimed is:

1. A grease filter comprising:
an upper and a lower baffle plate assembly, each baffle plate assemblies comprising:
a plurality of longitudinally extending baffle plates, each of said baffle plates having a pair of transversely curved laterally spaced flanges integral with a central bridge portion constituting a partition to define two spaced parallel channels open at opposite ends; and flat parallel bars secured to opposite end portions of each of said baffle plates for holding said baffle plates in spaced parallel position with the convex sides of said flanges abutting the bars; and adjustable spacer means holding said baffle plate assemblies in spaced opposing position with lateral edges of said baffle plates of one assembly aligned centrally of said channels in the other assembly, and with said bridge sections of each assembly centered between lateral edges of said spaced baffle plates in the other assembly, to define sinuous paths therebetween for grease laden air, so that grease collected in said channels of said upper baffle plate assembly drains into said channels of said lower baffle plate assembly and then drains out of the lower ends of the last named channels when said baffle plates are disposed in vertically inclined positions with ends of said baffle plates at the bottom ends of said baffle plate assemblies.

2. A grease filter unit as defined in claim 1, wherein said bridge portions of said baffle plates in said lower assembly are formed with grooves extending the full length of said baffle plates to receive liquid thrown centrifugally from said channels of said baffle plates in said upper assembly.

3. A grease filter unit as defined in claim 2, wherein said bridge portions of said baffle plates in said upper assembly are formed with depending apices to guide liquid from said channels of said upper baffle plate assembly to said channels and grooves of said lower baffle plate assembly.

4. A grease filter unit as defined in claim 3, wherein said baffle plates are made of a lightweight metal, so that the assemblies are fireproof and easy to handle with all surfaces of said metal being exposed to the grease laden air so that the vaporized grease condenses on said surfaces and runs into said channels and grooves.

5. A grease filter unit as defined in claim 3, wherein each of said baffle plate assemblies constitutes a structure with fixed parts having smooth exposed surfaces to facilitate flow of grease along said channels and to facilitate washing thereof.

6. A grease filter unit as defined in claim 1, wherein each of said baffle plate assemblies constitutes a structure with fixed parts having smooth exposed surfaces to facilitate flow of grease along said channels and to facilitate washing thereof.

7. A grease filter unit as defined in claim 6, wherein the said baffle plates are made of a lightweight metal, so that the assemblies are fireproof, and easy to handle, all surfaces of said metal being exposed to the grease laden air so that the vaporized grease condenses on said surfaces and runs into said channels and grooves.

8. A grease filter unit as defined in claim 1 wherein said adjustable spacer means comprises threaded bolts engaging the bars of both of said baffle plate assemblies, and coil springs on said bolts holding said assemblies in said spaced opposing position.

* * * * *